June 12, 1923.
G. W. OTTERSON
SELF LOADING VEHICLE
Filed May 5, 1923
1,458,241
2 Sheets-Sheet 1
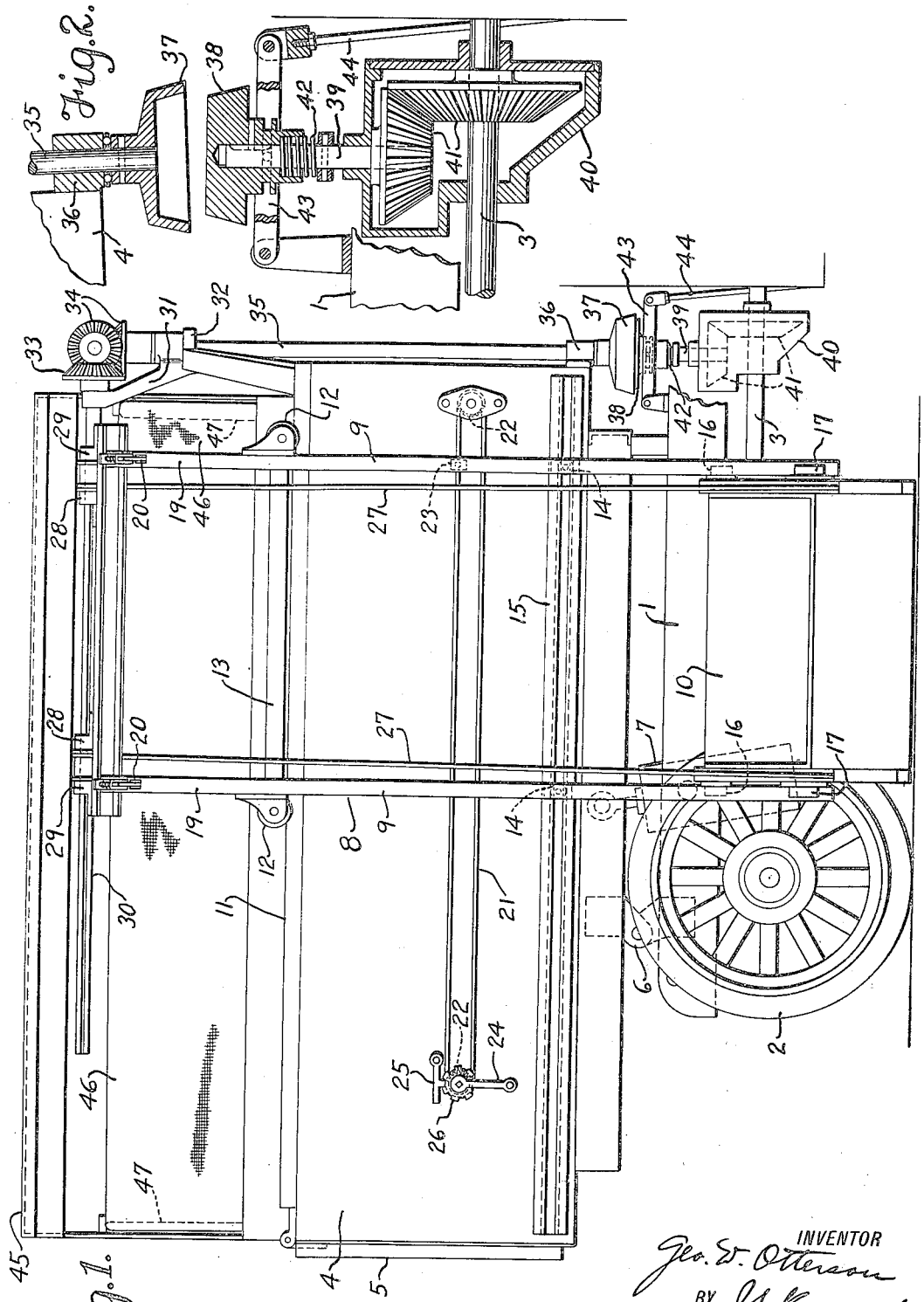

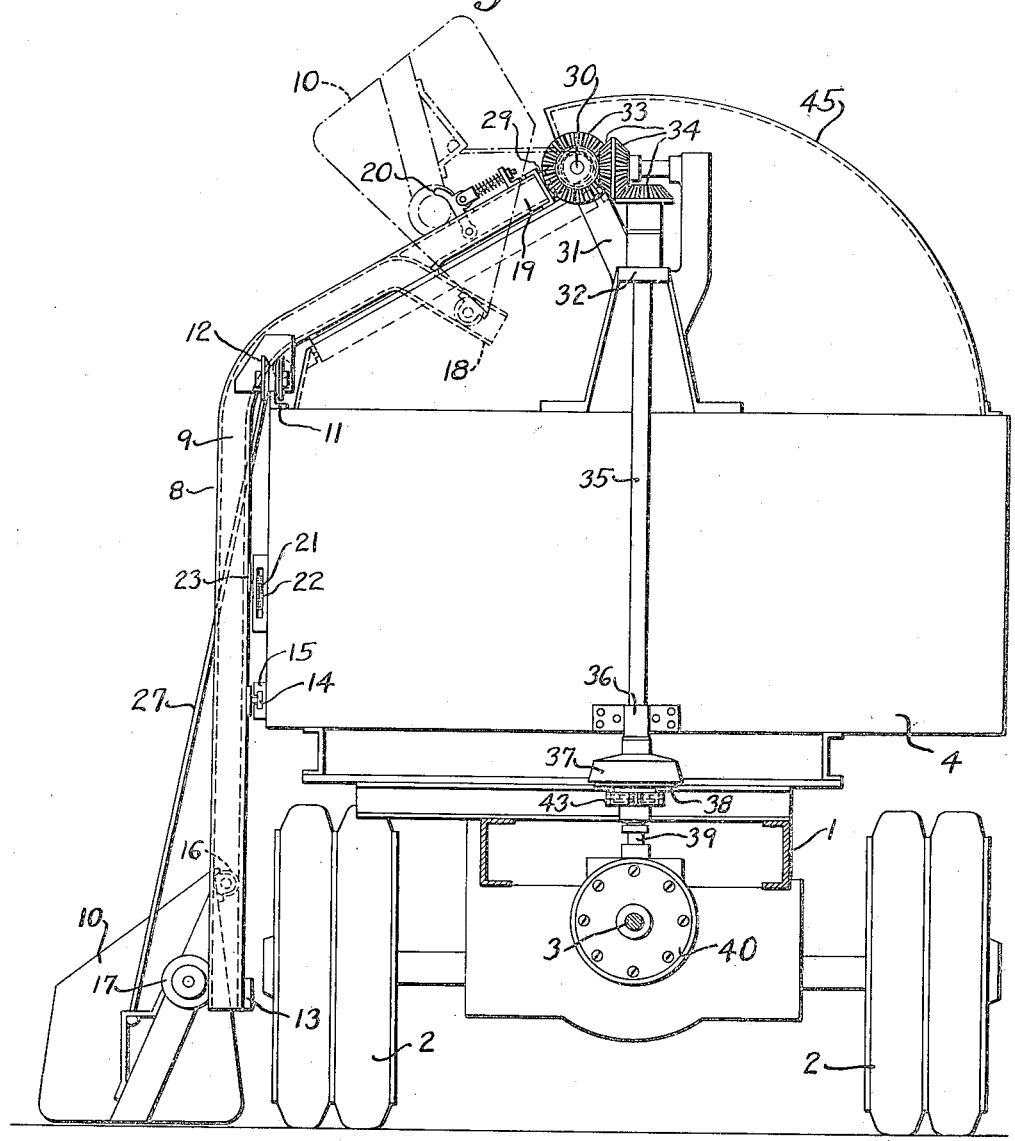

Patented June 12, 1923.

1,458,241

UNITED STATES PATENT OFFICE.

GEORGE W. OTTERSON, OF SEATTLE, WASHINGTON.

SELF-LOADING VEHICLE.

REISSUED

Application filed May 5, 1923. Serial No. 636,866.

*To all whom it may concern:*

Be it known that I, GEORGE W. OTTERSON, a citizen of the United States, and a resident of Seattle, in the county of King and State of Washington, have invented a new and useful Self-Loading Vehicle, of which the following is a specification.

The object of the invention is to provide an advantageous self-loading motor truck vehicle adapted for making ash and garbage collections or for other purposes. To this end the invention may be said to comprise the parts, improvements and combinations hereinafter described with reference to a preferred embodiment and set forth generically and specifically in the claims.

In the accompanying drawings, forming a part hereof:

Fig. 1 is a side elevation, the forward part of the vehicle being broken away;

Fig. 2 is an enlarged vertical sectional view showing the separable means for driving the loader, the parts being shown as if the vehicle body were slightly tilted; and Fig. 3 is a sectional front elevation, the plane of the section being just in front of the body and the drive for the loader.

The numeral 1 designates the chassis of a motor truck, and 2 its rear wheels. In the chassis is a longitudinal power shaft 3 driven from the engine (not shown) that drives the vehicle. This shaft may be the driving shaft of the vehicle in advance of the transmission, or it may be a special shaft connected with one of the power take-offs which are familiar in commercial trucks, the arrangement in any event being such that this shaft can be driven by the engine when the vehicle is at rest. Such matters being well known, require no special illustration.

Mounted on the chassis is a tiltable, rear-dumping cargo body 4, having a top hinged rear-gate 5 adapted to swing rearward. The hinge connection permiting the body to pivot in this manner is illustrated at 6, and the cylinder 7 is illustrative of any customary or suitable power means for uptilting the body to discharge its contents.

Carried as a part of the vehicle is a power-operated loader, which is designated generally 8. In certain generic aspects of the invention this loader may be of different types. Specifically and preferably it comprises a track 9 and a car 10 movable thereon from a point near the ground upward to dump its load into the body 4, and back again. In the construction herein more specifically contemplated the track is disposed at one side of the body.

Proceeding now with a description of this construction, it will be observed that a longitudinal rail or way 11 is arranged on the top of one of the sides of the body, this rail being engaged by grooved wheels 12 on a carriage which is formed by the track rails 9 and by suitable connecting members 13. Additional, lateral rollers 14 on this hoisting and dumping track carriage are engaged in a longitudinal channel 15 on the outside of the lower part of the side of the body, and brace the carriage against lateral tilting displacement either outward or inward. The track 9 is thus firmly supported on the tiltable body 4, yet can be shifted forward or rearward along the side so that the material can be deposited in the body at various regions lengthwise thereof, thus distributing the loading.

The track rails 9 consists of channels to receive forward rollers 16 on the car 10, other rollers 17 thereon in rear of the rollers 16 traveling on the outer flanges of the channels. These rails extend substantially vertically upward from a point sufficiently near the ground to the top of the side of the body, this portion of the track consequently lying close to the side of the vehicle. At the top of the body side the rails are bent inward at an inclination carrying them well toward the center of the top of the body; and at this region the track rails are provided with inwardly projecting dumping spurs 18 which diverge from the continuations 19 of the rails, so that when the car is hoisted to this part of the track the rollers 16 travel in the spur projections 18 while the rollers 17 proceed along the continuations 19, causing the car to be uptilted as indicated in dotted lines in Fig. 1. Spring bumpers 20 on the continuations 19 form an abutment limiting the movement of the car in this position.

The loader is shifted from time to time to cover the length of the body, and this is accomplished by means of an endless cable or sprocket chain 21 passing in longitudinal stretches along the lower portion of the side of the body 4, and about pulleys or sprocket wheels 22 mounted on said side near the opposite ends thereof. The upper stretch of this endless member is secured to a clip 23 on the forward one of the track rails 9, and the lower stretch is free. Thus, when the cable is operated in one direction by a crank handle 24 connected to the rear pulley, the loader is moved forward, and when the cable is operated in the other direction the loader is moved rearward. In any position the loader is locked and held by means comprising a dog 25 cooperative with a toothed wheel 26 mounted with the rear pulley.

The car 10 is hoisted and lowered by means of cables 27 which pass upward from the sides of the car to rotatable drums 28 journaled in brackets 29 on the upper end of the hoisting and dumping track carriage and movable forward and rearward therewith. These drums are slidably splined on a longitudinal driven shaft 30 extending longitudinally over the top of the body and having suitable fixed support upon the body 4 represented by an arm 31 of a forward gear bracket 32, whereby it is held against longitudinal movement, the shaft being fixedly supported or not at the rear.

On the forward end of the shaft 30 is a gear 33, by which through suitable intermediate gears 34 it is driven from the upper end of a shaft 35 which extends vertically downward at the front of the body by which it is carried, the shaft being journaled in the bracket 32 referred to and in another bracket 36 on the lower portion of the body. The lower end of this shaft carries a friction cone clutch member 37.

The complementary, driving member 38 is on the upper end of a short vertical shaft 39 projecting upward from a gear-case 40 mounted in the chassis, this shaft being driven by the shaft 3 through suitable gears 41. This friction member is slidably splined on its shaft, so as to be capable of yielding when the body 4, after having been tilted to dump, is lowered to its normal position bringing the member 37 down on the member 38, and is sustained by a spring 42 so as to produce a driving engagement. The cone clutch elements thus constitute embodiments of separable driving and driven elements carried by the chassis and tiltable body respectively whereby the loader can be driven when the body is down. They also afford a clutch for throwing the power on and off the loader at the proper times, a means for holding the car at the top in dumping position for the necessary brief period, and a means for effecting controlled lowering of the car. To these ends means are provided for shifting the clutch member 38 by the attendant, the said means being shown as comprising a yoke lever 43 and a link 44, which will be understood as passing to a handle or pedal at a suitable point. When the car is brought up against the bumpers 20 the clutch automatically slips, so that injury is prevented and the power merely serves to hold the car upturned against the buffer. Then, after the car has deposited the ashes or other material in the body, the operator moves the clutch member 38 very slightly against the action of the spring, so that the clutch slips more freely, permitting the car to descend, the rate of such descent being very easily controlled by the operator regulating the friction between the driving member turning in one direction and the driven member rotated by the weight of the car in the opposite direction.

The top of the body 4 is provided with a suitable cover 45 to restrain flying ashes or the like, this cover being arranged to leave a necessary opening along the side where the car discharges its material. In order to close this opening as much as may be, extensible and contractible closures are provided at opposite sides of the loader and connected thereto, so that when the loader is moved forward or rearward one closure automatically extends and the other shortens, and vice-versa. These closures may take the form, for example, of flexible strips 46 substantially the width of the opening, adapted to be wound and unwound upon spring shade rollers 47 mounted at the opposite ends of the body, the strips extending from these rollers toward the track rails 9, to which their ends are secured.

The operation will be briefly summarized. The vehicle having reached a point of collection is brought to rest, and the car 10 is lowered to the bottom of the track 9. The engine is to be understood as running and rotating the shaft 3. The clutch member 38 is held out while the car is receiving its load, and then put into driving engagement with the complementary member 37. This causes the car to be hoisted to the top of the track and there upturned so that its contents fall into the body. The clutch clips at this time, and next the operator causes the clutch to slip further so that the car runs down the track under the control of the operator. The car is reloaded and the operation is repeated. When one portion of the interior of the body becomes sufficiently filled the loader is moved to a new point along the side of the vehicle, and this may be done several times so that the body becomes evenly filled from front to rear. When the body has been sufficiently loaded the vehicle is driven to the appropriate spot, the rear gate unlocked, and the body uptilted to dump. In this operation the drive for the hoist separates at the clutch members 37, 38, the clutch member 37 rising away from the member 38. On again lowering the body the spring 42 cushions the contact of the members, preventing shock to the shafts and bearings. When the vehicle is traveling the loader forms no undue projection likely to cause trouble. When the machine is traveling or the loader is not in use, the clutch is held out in an appropriate manner.

While the preferred embodiment of the invention has been described in detail, it will be understood that numerous other and specifically different embodiments are possible, and I do not therefore wish to limit myself to the precise construction illustrated.

This application is in part a continuation of my application serial No. 281,201, filed March 7, 1919.

What I claim as new is:

1. A self-loading vehicle having a chassis, a power shaft therein, a cargo body tiltably mounted on the chassis, a loader on the body, mechanism for driving the loader from said power shaft comprising cooperative separable driving and driven members connected respectively with said shaft and with the tiltable body, and means for separating and reconnecting said members when the tiltable body is in normal position.

2. A self-loading vehicle having a chassis, a power shaft therein, a cargo body tiltably mounted on the chassis, a loader on the body, mechanism for driving the loader from said power shaft comprising cooperative friction members connected respectively with said shaft and with the tiltable body and automatically separable upon the tilting of the body, and operator's means for controlling one of said members.

3. A self-loading vehicle having a chassis, a power shaft therein, a cargo body tiltably mounted on the chassis, a loader on the body, and mechanism for driving the loader from said power shaft comprising a friction clutch adapted to slip, the members of which clutch are carried by the body and chassis respectively, and operator's means for controlling the clutch.

4. A self-loading vehicle having a chassis, a power shaft therein, a cargo body tiltably mounted on the chassis, a hoisting and dumping loader on the body, and mechanism for driving the loader from said power shaft comprising cooperative friction members connected respectively with said shaft and with the tiltable body and automatically separable upon the tilting of the body, one of said members being yieldable and spring pressed into a driving engagement with the other which is adapted to slip automatically when the loader is dumping, and operator's means for controlling one of said members.

5. A self-loading vehicle having a chassis, a power shaft therein, a cargo body tiltably mounted on the chassis, a loader on the body, and mechanism for driving the loader from said power shaft comprising cooperative clutch members mounted on alined vertical axes, one on the tiltable body connected with the loader and one on the chassis connected with the power shaft.

6. A self-loading vehicle having a chassis, a power shaft therein, a cargo body tiltably mounted on the chassis, a loader on the body, mechanism for driving the loader from said power shaft comprising cooperative clutch members mounted on alined vertical axes, one on the tiltable body connected with the loader and one on the chassis connected with the power shaft, said clutch members being frictional and one of them being spring-pressed, and operator's means for controlling this clutch member.

7. A self-loading vehicle having a chassis, a power shaft therein, a cargo body tiltably mounted on the chassis, a loader on the body, and mechanism for driving the loader from said power shaft comprising a short vertical shaft in the chassis geared to the power shaft, a clutch member on the upper end of this shaft, a vertical shaft on the tiltable body connected with the leader, a clutch member on the lower end of this shaft to cooperate with the other clutch member, and means for controlling one of the clutch members.

8. A self-loading vehicle having a chassis, a power shaft therein, a cargo body tiltably mounted on the chassis, a loader on the body, and mechanism for driving the loader from said power shaft comprising a short vertical shaft in the chassis geared to the power shaft, a clutch member on the upper end of this shaft, a vertical shaft on the tiltable body connected with the loader, a clutch member on the lower end of this shaft to cooperate with the other clutch member, said clutch members being frictional and one of them being axially movable on its shaft and having a spring pressing it, and operator's means for exerting pressure on this clutch member contrary to the spring.

9. A self-loading vehicle having a tiltable cargo body, a stationary driven shaft extending longitudinally of the body, a hoisting and dumping track carriage mounted on the body for movement forward and rearward at one side thereof and relatively to said shaft, a car movable on the track, and means on the carriage driven from said shaft for hoisting the car, in combination with a vertical shaft on the forward end of the tiltable body geared at its upper end to said longitudinal shaft and having a clutch member on its lower end, power driving means in the chassis of the vehicle having a clutch member to cooperate with said other clutch member, the clutch members separating automatically when the body is tilted, and operator's means for controlling one of the clutch members.

10. In a self-loading vehicle, the combination of a chassis, a tiltable body, a power shaft in the chassis, a loader on the tiltable body comprising a car and means for hoisting the car to a dumping position and for lowering the same, an abutment for arresting the movement of the car at the dumping position a friction driving member on the chassis driven by said power shaft, a cooperative friction member carried by the tiltable body and connected with said hoisting and lowering means, said friction members being capable of slipping, and operator's means for controlling one of the members so as to effect controlled lowering of said car.

11. In a self-loading vehicle, the combination of a chassis, a tiltable body, a power shaft in the chassis, a track on the tiltable body having a dumping region at the top, a car movable up and down the track to dump its contents into the body, means on the body for hoisting and lowering the car, a friction driving member on the chassis driven by said power shaft, a cooperative friction driven member carried by the tiltable body and connected with said hoisting and lowering means, said friction members being capable of slipping, and operator's means for controlling one of the members.

12. A self-loading vehicle having a cargo body, a loader on the vehicle comprising a car and means for hoisting the same to dump into the body, a power shaft, a friction clutch between said power shaft and the loader, said clutch adapted to slip automatically when the car has been raised to the dumping position, and means for operating said clutch to effect lowering of the car.

GEORGE W. OTTERSON.